United States Patent
Aithal et al.

(10) Patent No.: US 9,559,973 B1
(45) Date of Patent: Jan. 31, 2017

(54) WIRELESS COMMUNICATION LINK BANDWIDTH UTILIZATION MONITORING

(75) Inventors: Prakasha Aithal, Kanata (CA); Geoff Nichols, Dunrobin (CA)

(73) Assignee: DRAGONWAVE INC., Kanata, ON (CA)

( * ) Notice: Subject to any disclaimer, the term of this patent is extended or adjusted under 35 U.S.C. 154(b) by 709 days.

(21) Appl. No.: 12/457,287

(22) Filed: Jun. 5, 2009

(51) Int. Cl.
*G06F 15/16* (2006.01)
*H04L 12/801* (2013.01)
*G06F 15/173* (2006.01)
*H04L 12/851* (2013.01)

(52) U.S. Cl.
CPC ........... *H04L 47/29* (2013.01); *H04L 47/2441* (2013.01)

(58) Field of Classification Search
CPC ....... H04L 47/25; H04L 47/2441; H04L 47/29
USPC ................ 709/250, 224, 232, 233, 234, 235
See application file for complete search history.

(56) References Cited

U.S. PATENT DOCUMENTS

| | | | | |
|---|---|---|---|---|
| 5,699,126 A * | 12/1997 | Hong | ............................ | 348/625 |
| 5,867,483 A * | 2/1999 | Ennis et al. | .................. | 370/252 |
| 6,049,798 A * | 4/2000 | Bishop et al. | | |
| 7,543,052 B1 * | 6/2009 | Cesa Klein | ................... | 709/224 |
| 7,873,074 B1 * | 1/2011 | Boland | ......................... | 370/468 |
| 8,006,195 B1 * | 8/2011 | Woodings et al. | ........... | 715/777 |
| 2002/0152305 A1 * | 10/2002 | Jackson et al. | ............... | 709/224 |
| 2002/0156911 A1 * | 10/2002 | Croman et al. | ............... | 709/235 |
| 2003/0135613 A1 * | 7/2003 | Yoshida et al. | ............... | 709/224 |
| 2004/0143663 A1 * | 7/2004 | Leedom et al. | .............. | 709/226 |

* cited by examiner

*Primary Examiner* — Joseph Greene

(57) ABSTRACT

Wireless communication link bandwidth utilization monitoring apparatus and methods are disclosed. Utilization of bandwidth on a wireless communication link is monitored to generate bandwidth utilization information. In order to provide a record of the distribution of bandwidth utilization, durations of bandwidth utilization above respective different thresholds might be determined. Such distributions could be useful for such purposes as network analysis and/or customer billing based on actual wireless bandwidth usage. Bandwidth utilization information may be collected from multiple wireless link nodes, illustratively the wireless link nodes at both ends of monitored wireless communication links, to allow total bandwidth utilization for bi-directional communications over the monitored links to be determined.

15 Claims, 3 Drawing Sheets

WIRELESS COMMUNICATION LINK BANDWIDTH UTILIZATION MONITORING

FIELD OF THE INVENTION

This invention relates generally to communications and, in particular, to monitoring utilization of bandwidth on wireless communication links.

BACKGROUND

Ethernet networks can be realized using meshed or ringed network architectures. The use of wireless technology in the core and access links of such networks is gaining momentum because of the ease of installation of such links and the associated lower installation cost. One driving factor of post-installation cost, however, is the bandwidth offered by wireless links. While per link bandwidth offered by wireless links is controlled by varying factors such as radio spectrum in use, coding and modulation techniques used, etc., some of these factors are regulated by governing bodies. Customers using these links are therefore often faced with paying for the full bandwidth offered by the links even though their actual bandwidth requirements based on amounts of communication traffic could be much lower than the full bandwidth.

One way to mitigate this problem is to initially purchase a certain amount of bandwidth, to which communication traffic will be rate limited. This allows a customer to pay for an amount of bandwidth that is estimated to be sufficient for current requirements, instead of the full bandwidth offered by wireless links. Additional bandwidth can then be purchased as the need arises.

However, this type of mechanism may pose problems, especially in larger networks. For example, each wireless link might need to be individually monitored by the customer to check its bandwidth utilization. For this purpose, the customer would need some sort of mechanism to continuously monitor the bandwidth requirement of each link, which of course would be very tedious in a large network. Also, since bandwidth is limited to the amount that the customer originally purchased, rate-limited links might not be able to support bursty traffic which exceeds the pre-purchased bandwidth. This results in links discarding excess traffic.

A pre-purchase and rate-limiting mechanism may also create difficulties when additional bandwidth is needed, such as where links must be individually upgraded if higher bandwidth is required.

SUMMARY

According to an embodiment of the invention, an apparatus includes: a wireless interface that enables communications over a wireless communication link; a utilization monitor, operatively coupled to the interface, that monitors utilization of bandwidth on the wireless communication link and generates bandwidth utilization information; and a monitor interface, operatively coupled to the utilization monitor, that provides access to the bandwidth utilization information.

The utilization monitor may generate the bandwidth utilization information by calculating average throughput of the wireless communication link based on a time period. The monitor interface may also enable user configuration of the time period.

In some embodiments, the utilization monitor generates the bandwidth utilization information by determining a peak bandwidth utilization.

The utilization monitor may generate the bandwidth utilization information by determining durations of bandwidth utilization above respective different thresholds. In this case, the monitor interface may also enable user configuration of one or more of the respective different thresholds.

The apparatus may also include a memory operatively coupled to the utilization monitor. The utilization monitor may then write records of the bandwidth utilization information to the memory, with each record including a unique identifier of the wireless communication link and a time stamp indicating a time at which the record was written to the memory. The utilization monitor may also generate verification information for use in verifying each record and store the verification information in the memory.

The utilization monitor may transmit the bandwidth utilization information through the monitor interface.

In some embodiments, the monitor interface is operatively coupled to the memory and enables the records to be retrieved from the memory.

Such an apparatus might be implemented in a wireless link node of a communication system, and in combination with a management system that includes a monitor interface that enables the management system to access the bandwidth utilization information.

In this type of combination, the wireless link node might be one of multiple wireless link nodes of the communication system, with each wireless link node including: a wireless interface that enables communications over a respective wireless communication link; a utilization monitor that monitors utilization of bandwidth on the respective wireless communication link and generates bandwidth utilization information; and a monitor interface that provides access to the bandwidth utilization information. The management system could then collect the bandwidth utilization information from the wireless link nodes.

A machine-implemented method is also provided, and includes: monitoring utilization of bandwidth on a wireless communication link; generating bandwidth utilization information based on the monitoring; and providing access to the bandwidth utilization information.

Generating may involve calculating average throughput of the wireless communication link based on a time period. The time period is set in some embodiments based on user input.

The generating operation may also or instead involve determining a peak bandwidth utilization.

In some embodiments, generating involves determining durations of bandwidth utilization above respective different thresholds. One or more of the respective different thresholds could be set based on user input.

The method may also involve writing records of the bandwidth utilization information to a memory, with each record comprising a unique identifier of the wireless communication link and a time stamp indicating a time at which the record was written to the memory. Verification information for use in verifying each record could be generated and stored in the memory.

The operation of providing access to the bandwidth utilization information may involve one or more of: transmitting the bandwidth utilization information, and providing access to the records in the memory.

Such a method might be implemented, for example, in each of multiple wireless link nodes associated with respective wireless communication links. In this case, the method may also involve collecting the bandwidth utilization information from the wireless link nodes.

A method might also or instead be embodied in a computer-readable medium storing instructions which when executed by a computer cause the computer to perform the method.

Another aspect of the invention provides an apparatus including: a monitor interface that enables access to bandwidth utilization information generated at wireless link nodes on the basis of monitoring utilization of bandwidth on respective wireless communication links associated with the wireless link nodes; and a utilization information collector, operatively coupled to the monitor interface, that collects the bandwidth utilization information for one or more of the wireless communication links from the wireless link nodes associated with the one or more wireless communication links.

A machine-implemented method is also provided, and includes: collecting, from a plurality of wireless link nodes, bandwidth utilization information generated at the wireless link nodes on the basis of monitoring utilization of bandwidth on one or more respective wireless communication links associated with the wireless link nodes; and processing the collected bandwidth utilization information.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION

Figure 1:
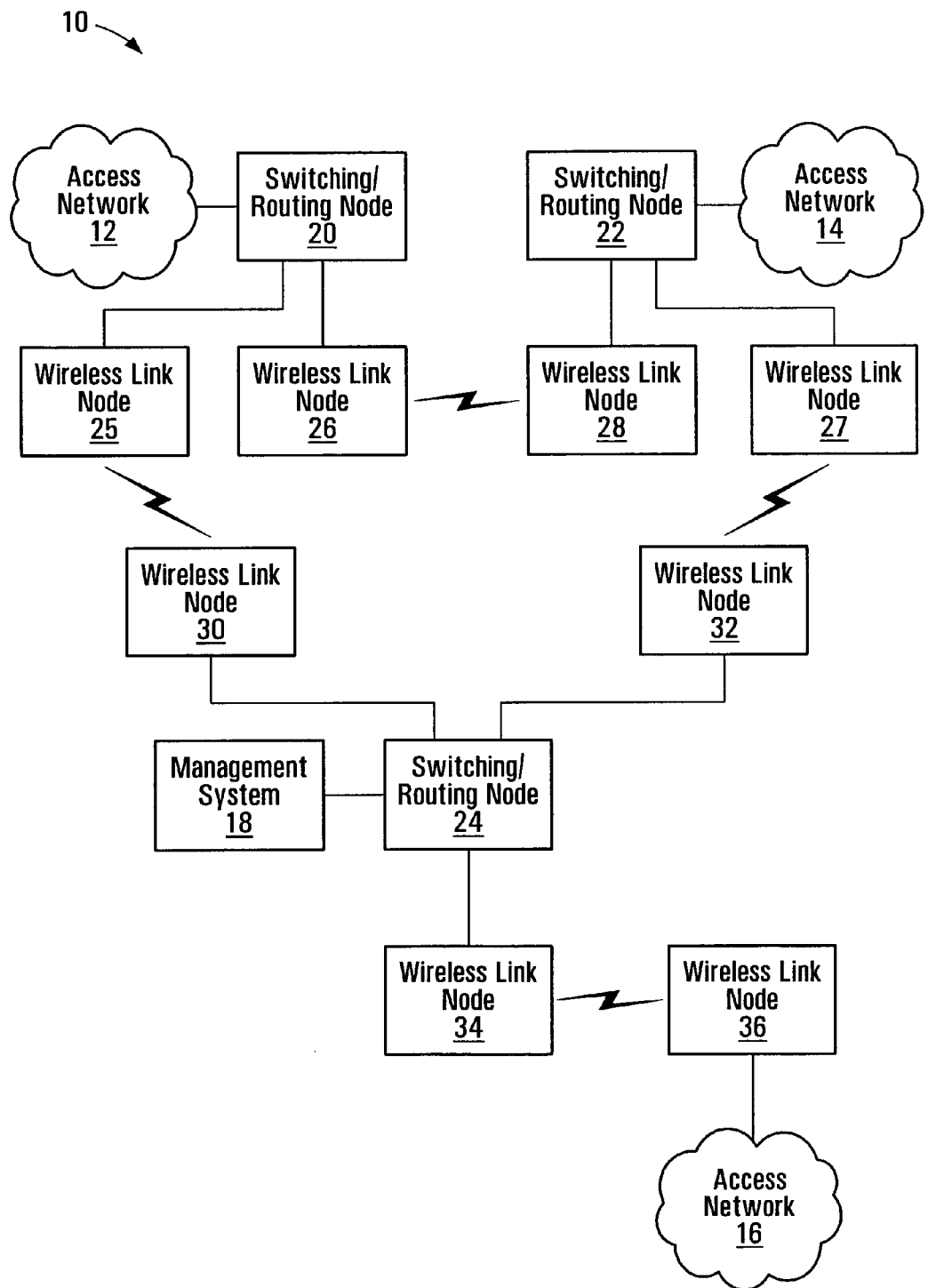
FIG. 1 is a block diagram of a communication system.

FIG. 1 is a block diagram of a communication system 10, which includes access networks 12, 14, 16, illustratively LANs (Local Area Networks). Switching/routing nodes 20, 22, 24 that are at least coupled to or form part of the access networks 12, 14, 16 enable communications between the user networks through a core network. A management system 18, through which various functions of the switching/routing nodes 20, 22, 24 such as QoS (Quality of Service) can be configured and managed, is also shown.

For a wireless ring/mesh network implementation, the switching/routing nodes 20, 22, 24 are operatively coupled to respective wireless link nodes 25, 26, 27, 28, 30, 32. The wireless link nodes 25, 26, 27, 28, 30, 32 enable the switching/routing nodes 20, 22, 24, and thus the access networks 12, 14, 16 to communicate over wireless communication links. FIG. 1 also shows wireless link nodes 34, 36, to illustrate that wireless communication links might be used not only in the core network, but also in the access networks 12, 14, 16.

Although the access networks 12, 14, 16 may include many nodes, only one switching/routing node 20, 22, 24 per network is shown in FIG. 1 to avoid overly complicating the drawing. It will also be appreciated that a core network could interconnect many more than three switching/routing nodes.

Those skilled in the art will be familiar with various communication systems having a general structure similar to that of the system 10, the types of communication equipment such as the switching/routing nodes 20, 22, 24 provided in such systems, and the operation thereof. The system 10 might be a simple Ethernet wired mesh/ring network with the three switching/routing nodes 20, 22, 24 interconnecting the different access networks 12, 14, 16, for instance. Various types of wireless communication equipment which could be deployed as the wireless link nodes 25, 26, 27, 28, 30, 32, 34, 36 will also be known to those skilled in the art. Embodiments of the present invention relate primarily to logging bandwidth utilization over wireless communication links and is not specific to any particular type of communication system, network, or equipment.

Embodiments of the invention provide mechanisms that may be used to mitigate shortcomings associated with rate limiting communication traffic to pre-purchased bandwidth. In particular, some embodiments provide for automatic monitoring of actual bandwidth requirements by a service provider, network operator, or equipment vendor, for example, such that a customer purchasing access to wireless communication links is not responsible for monitoring each link. The mechanisms disclosed herein also provide support for bursty traffic up to an entire available bandwidth of a wireless link without dropping excess traffic, while allowing a customer to pay for the amount of bandwidth that is actually used.

Figure 2:
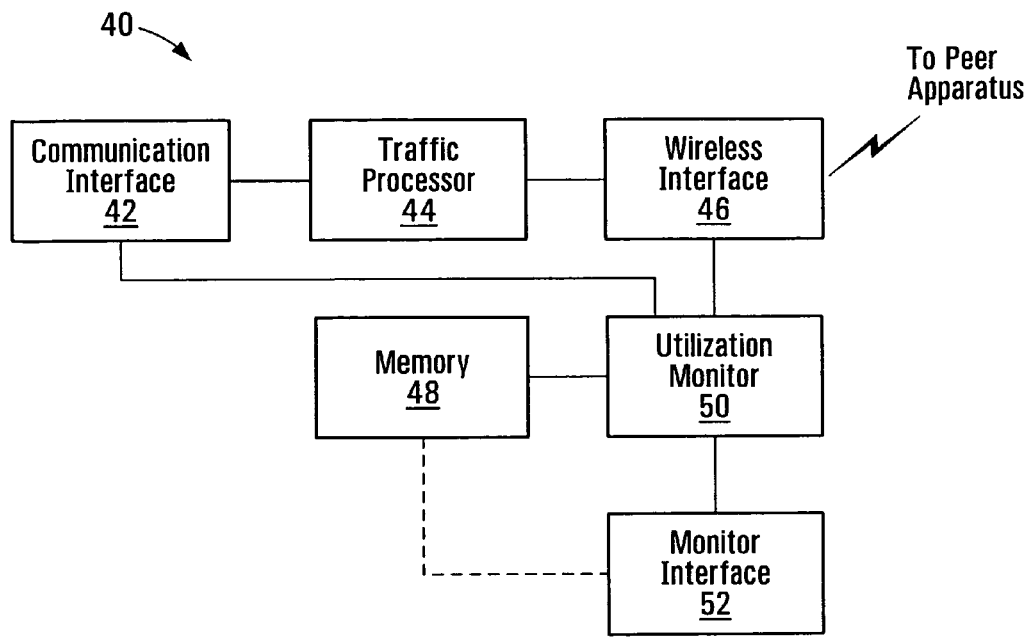
FIGS. 2 and 3 are block diagrams of apparatus according to embodiments of the present invention.

FIG. 2 is a block diagram of an example apparatus according to an embodiment of the present invention. The apparatus 40 includes a communication interface 42, a wireless interface 46, and a monitor interface 52. A traffic processor 44, a utilization monitor 50, and a memory 48 are operatively coupled to the interfaces 42, 46, 52 and to each other as shown.

Communication equipment in which the example apparatus 40 is implemented, such as a wireless link node, may include additional components that have not been explicitly shown in FIG. 2 in order to avoid overly complicating the drawing. More generally, other embodiments may include further, fewer, or different components which may be interconnected in a similar or different manner than shown.

The communication interface 42 includes components which support communications over respective communication links, which in one embodiment include a link to an Ethernet switching/routing node. Such components often include hardware at least in the form of a physical port or connector. Traffic processing such as QoS processing, for example, may also be performed by the communication interface 42, although a separate traffic processor 44 for performing such functions is shown in the example apparatus 40. The communication interface 42 and the traffic processor 44 are intended to represent modules that handle communication traffic that is received by the apparatus 40.

Hardware, firmware, components which execute software, or some combination thereof might be used in implementing the communication interface 42, and possibly other elements of the apparatus 40. Electronic devices that may be suitable for this purpose include, among others, microprocessors, network processors, microcontrollers, PLDs (Programmable Logic Devices), FPGAs (Field Programmable Gate Arrays), ASICs (Application Specific Integrated Circuits), and other types of "intelligent" integrated circuits.

The exact structure of a communication interface 42 may, to at least some extent, be implementation-dependent, and could vary depending on the type of connection(s) and/or protocol(s) to be supported. In one embodiment, the communication interface 42 supports Ethernet communications, in which case Ethernet frames are processed to extract content for transmission via a wireless communication link that is provided by the wireless interface 46. Inverse processing is applied to traffic that is received over the wireless communication link through the wireless interface 46, so that such traffic may be transmitted from the apparatus 40 in Ethernet frames.

The wireless interface 46 and the monitor interface 52, like the communication interface 42, include components such as physical ports or connectors and possibly other components which support communications over respective communication links. In the case of the wireless interface 46, these components may include at least a wireless modem, a radio, and/or other components that are used in communicating over wireless communication links. In one embodiment, the monitor interface 52 is a management interface through which a wireless link node is configured and managed. In an example described in further detail below, various configuration and information access functions associated with bandwidth monitoring are implemented using a CLI (Command Line Interface). A CLI is commonly used in communication network management, and therefore might already be available for many types of wireless link nodes. An existing CLI could thus be supplemented with additional functions for bandwidth monitoring, such that the monitor interface 52 need not be an additional and dedicated interface.

As noted above for the communication interface 42, the structures of the wireless interface 46 and the monitor interface 52 may be dependent upon the type of connection(s) and/or protocol(s) that are to be supported.

The traffic processor 44 and the utilization monitor 50 may similarly be implemented using hardware, firmware, and/or components which execute software. These modules are defined moreso by their functions rather than a particular internal structure. The present disclosure would enable a skilled person to implement these modules in any of various ways to perform their respective functions.

Any of various different types of memory devices may be used to implement the memory 48. In one embodiment, the memory 48 is a Flash memory device. However, it should be appreciated that the memory 48 could potentially be implemented using other solid state memory devices or memory devices which use movable or even removable storage media. One or multiple memory devices, of the same or different types, could be provided.

The apparatus 40 allows the wireless communication link provided by the wireless interface 46 to operate at its full capable bandwidth, which as described above is determined by various radio characteristics. This bandwidth might be well in excess of any current requirements of a customer. The customer thus has access to the full bandwidth of the wireless communication link.

Bandwidth logging as disclosed herein may involve calculating the average throughput of the wireless communication link based on a time period, which in some embodiments is programmable by network operator or service provider personnel. Other bandwidth utilization information or characteristics could also or instead be tracked. For example, peak bandwidth and/or peak average bandwidth usage, illustratively on a daily basis, could be recorded with a date and/or time stamp to allow usage spikes and associated times to be tracked. Tracking of time durations of bandwidth utilization above different, and possibly programmable, thresholds is also contemplated. Such multiple-threshold tracking, like peak tracking, could be recorded on a daily basis and possibly with date and/or time stamps.

Records including bandwidth utilization information are stored in the memory 48 in some embodiments. These records could include uniquely identifiable system information associated with the wireless communication link, such as a wireless link node serial number or a wireless communication link serial number, in order to distinguish records that are associated with different wireless communication links. A record could remain in the memory for a certain amount of time or, in the case of a circular store, until overwritten. In one embodiment, records are stored in the memory 48 for multiple days.

Utilization information may be used by a service provider, network operator, or equipment vendor, for example, to determine usage charges that are to be passed along to a customer. The accuracy of the utilization information can thus be important. Generating and attaching a hash key to each record protects the integrity of the record. The hash key can then be used, by management systems or servers for instance, to verify records that are collected from wireless link nodes before those records are used to bill a customer for the wireless bandwidth that was actually by that customer.

Considering the example apparatus 40 and its operation in more detail, the wireless interface 46 enables communications over a wireless communication link to a peer apparatus, and the utilization monitor 50 monitors utilization of bandwidth on the wireless communication link and generates bandwidth utilization information. The monitor interface 52 provides access to the bandwidth utilization information.

In one embodiment, the bandwidth utilization information is calculated by the utilization monitor 50 on the basis of the far-end bandwidth setting for a wireless communication link and the rate at which traffic egresses from the communication interface 42. The bandwidth setting defines the bandwidth that is available on the wireless communication link for transmitting traffic toward the apparatus 40, and the rate of egress from the communication interface 42 provides a measure of actual throughput of the wireless link where traffic received that is received on the link is to be transmitted through the communication interface, to a core network for instance. Dividing the egress rate by the far-end bandwidth setting provides utilization information in the form of a ratio or percentage of actual throughput through a wireless link node relative to the available bandwidth of the wireless link.

To support such a utilization calculation, the peer apparatus at the far end of the wireless communication link over which the wireless interface 46 enables communications could be configured to report or otherwise provide its bandwidth setting for that link, in the direction toward the apparatus 40, to the utilization monitor 50 through a side channel on the wireless link, for example. The bandwidth setting may be reported in any of various ways. For example, a bandwidth setting could be reported by the peer apparatus as an actual set bandwidth or wireless configuration settings from which the bandwidth can be determined by the utilization monitor 50. The wireless interface 46, the utilization monitor 50, or another component of the apparatus 40 could similarly provide, to the peer apparatus, its bandwidth setting for the other direction on the wireless communication link. This enables the peer apparatus to perform the same utilization calculation for the other direction on the link. Exchanges of bandwidth setting information between an apparatus and its peer apparatus could be initiated according to a request/response mechanism, or automatically according to a predetermined schedule, for example.

At the apparatus 40 and the peer apparatus, the rate of egress through the communication interface 42 is available locally, and could be determined by the utilization monitor 50 or determined by the communication interface 42 and provided to the utilization monitor.

It will be apparent from the foregoing that the apparatus at both ends of a wireless communication link may be as shown in FIG. 2. Each apparatus may then perform the same calculations to determine the actual throughput of a wireless communication link in one direction. Together, the calculations performed at both ends provide a measure of bi-directional bandwidth utilization on the link.

Other types of bandwidth utilization calculations are also possible. For example, in implementations where communication traffic that is received through the wireless interface 46 is not necessarily transmitted through the communication interface 42, it might be more appropriate to calculate bandwidth utilization information based on a rate of egress from the wireless interface 46 without taking the egress rate from the communication interface 42 into account. Bandwidth utilization information also need not necessarily be calculated as a ratio or percentage. Absolute bandwidth utilization measures may also or instead be used.

The bandwidth utilization information may be generated by the utilization monitor 50 by calculating average throughput of the wireless communication link based on a time period, for example. In one embodiment, this average is a moving average that is calculated using a moving time window. This can effectively spread out the impact of a short-lived spike in utilization over multiple averaging time periods.

Peak bandwidth utilization and/or durations of bandwidth utilization above respective different thresholds may also or instead by monitored by the utilization monitor 50 and included in the bandwidth utilization information. These thresholds might be defined, for example, as percentages of a bandwidth setting at the far end of a wireless communication link, as percentages in excess of an amount of bandwidth that has been pre-purchased by a customer, or as absolute bandwidth values. Calculation of bandwidth utilization information as a ratio or percentage of the rate of egress from the communication interface 42 relative to the far-end bandwidth setting as described above might be particularly useful in conjunction with thresholds that are defined in terms of percentages of the bandwidth setting.

The utilization monitor 50 may write records of the utilization information to the memory 48. As noted above, a record may include a unique identifier of the wireless communication link and a time stamp indicating a time at which the record was written to the memory 48. The identifier and the time stamp are included in the record by the utilization monitor 50 in the example apparatus 40.

Verification information, illustrative a hash, for use in verifying each record may also be calculated by the utilization monitor and stored with the records. MD5 (Message Digest algorithm 5) is an example of a hash algorithm that could be used to generate verification information. When a record and its hash value are retrieved from the memory 48, a new hash value can be calculated from the retrieved record or the portions of a record that are used by the utilization monitor 50 in generating hash values. If the new hash value matches the retrieved hash value, then the portions of the record that were used to generate the retrieved hash value have not been altered since the record was stored in the memory 48. The highest level of protection of the utilization information records is provided by calculating hash values over entire records.

The present invention is in no way limited to protecting records using hash values. Other mechanisms for protecting the integrity of utilization information records are also possible.

Access to the utilization information may be provided through a "push" mechanism or a "pull" mechanism. In a push mechanism, the utilization monitor 50 transmits the utilization information through the monitor interface 52. The utilization information could be transmitted periodically, illustratively the same time every day or the same time and day each week. A pull mechanism might involve requesting the utilization information from the utilization monitor 50 through the monitor interface 52, using a CLI command, for example. Another pull option would be to access utilization information in the memory 48. The memory 48 might therefore be coupled to the monitor interface 52 in some embodiments, as shown by the dashed line in FIG. 2.

These types of utilization information access mechanisms are not necessarily mutually exclusive. For example, providing support for both a push mechanism and a pull mechanism would allow the utilization monitor 50 to provide periodic updates, and would also allow utilization information to be accessed between updates.

Bandwidth utilization monitoring parameters such as an averaging time period, utilization thresholds, and/or a reporting period for a push mechanism could potentially be user configurable. Network operator, service provider, or equipment vendor personnel might configure these and/or possibly other settings which control bandwidth utilization monitoring by entering CLI commands into a remote management system such as the management system 18 (FIG. 1), for example. Other settings could similarly be configurable.

Figure 3:
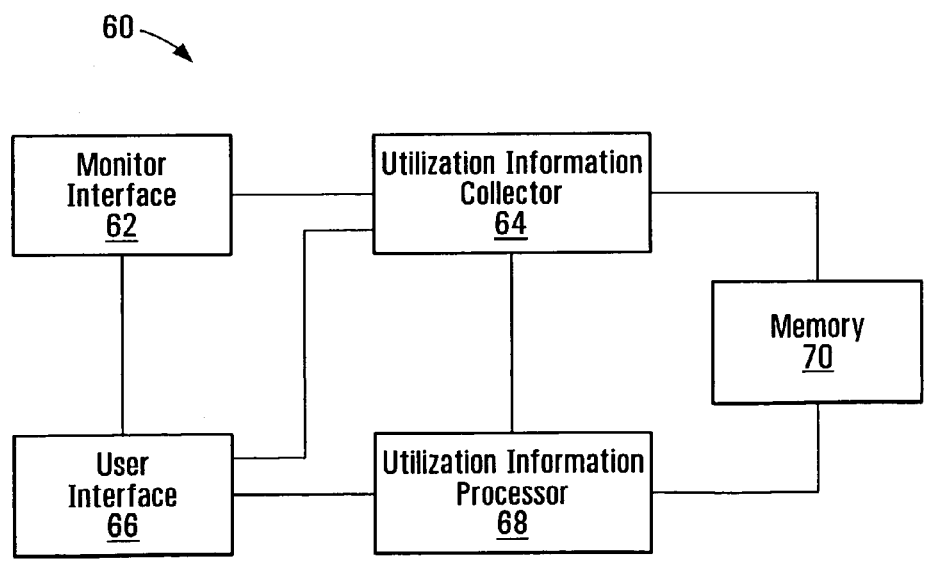

FIG. 3 is a block diagram of an example apparatus according to a further embodiment of the invention. The apparatus 60 includes a monitor interface 62, a utilization information collector 64, a user interface 66, a utilization information processor 68, and a memory 70 which are operatively coupled to each other as shown. As noted above for FIG. 2, communication equipment in which the example apparatus 60 is implemented, such as a management system 18 (FIG. 1), may include additional components that have not been explicitly shown in FIG. 3 in order to avoid overly complicating the drawing. In some embodiments, the apparatus 60 is implemented at one or more wireless link nodes, illustratively at a master wireless link node for monitoring bandwidth utilization over its wireless communication link(s) and/or other wireless links. Thus, other embodiments may include further, fewer, or different components which may be interconnected in a similar or different manner than shown.

The monitor interface 62 is compatible with the monitor interface 52, and these interfaces are identical in some embodiments. The memory 70 includes one or more memory devices and, like the memory 48, may be implemented using memory devices of any of various types. The user interface 66 may include one or more devices that accept inputs from a user, provide outputs to a user, or both. A display and a keyboard, for example, may provide a CLI through which various functions of bandwidth utilization monitoring may be configured and/or used. The utilization information collector 64 and the utilization information processor 68 may be implemented using hardware, firmware, and/or components which execute software.

In operation, the monitor interface 62 enables access to utilization information that is generated at one or more wireless link nodes on the basis of monitoring utilization of bandwidth on respective wireless communication links associated with the wireless link nodes. With reference to both FIG. 2 and FIG. 3, the monitor interface 62 enables access to the bandwidth utilization information that is generated by the apparatus 40, through its compatible monitor interface 52.

The utilization information collector 64 collects the utilization information for one or more wireless communication links from the wireless link nodes. For example, the apparatus 40 could be implemented at any or all of the wireless link nodes 25, 26, 27, 28, 30, 32, 34, 36, (FIG. 1) and the apparatus 60 could be implemented at the management system 18. The utilization information collector 64 could then collect bandwidth utilization information from the utilization monitors 50 at each wireless link node.

Collected utilization information may be processed by the utilization information processor 68, to determine usage charges that are to be assessed to customer(s) for usage of their wireless communication links. This processing may include, for example, identifying records that are associated with all of the wireless communication links of a particular customer and determining an amount of bandwidth usage for which the customer is to be charged, for example.

As described above, apparatus 40 (FIG. 2) in the wireless link nodes at each end of a wireless communication link may perform respective bandwidth utilization calculations for opposite directions on the same wireless link. The utilization information collector 64 may collect this information from the peer wireless link nodes for each wireless communication link, which would enable the utilization information processor to 68 to make link-level bandwidth utilization calculations for total bi-directional bandwidth utilization.

Thresholds such as those described above in conjunction with the utilization monitor 50 could also or instead be applied by the utilization information processor 68. For example, the utilization monitors 50 at each end of a wireless communication link could generate uni-directional bandwidth utilization information as ratios or percentages of actual throughput relative to far-end bandwidth settings for opposite directions on the wireless link. This bandwidth utilization information could then be collected by the utilization information collector 64. The utilization information processor 68 may combine the collected uni-directional bandwidth utilization information to determine total bandwidth utilization in both directions on the wireless communication link and record the times and/or time durations during which the total bi-directional ratio or percentage thresholds for the wireless link are exceeded.

Any or all of the collected utilization information, information such as the utilization thresholds for use by the utilization information collector 64 and/or the utilization information processor 68, and results of processing the utilization information may be stored in the memory 70. Although FIG. 3 shows the utilization information collector 64 and the utilization information processor 68 as being operatively coupled together, it is possible that collected utilization information would be stored in the memory 70 by the utilization information collector and subsequently accessed by the utilization information processor, especially where large amounts of utilization information are collected at one time.

The user interface 66 could be used not only to configure bandwidth utilization monitoring at remote wireless link nodes, but also to control collection and processing of utilization information. A pull operation, for instance, could be initiated by entering a command into a CLI. A command or request could then be sent to the utilization information collector 64, or to a remote utilization monitor 50 or memory 48. How and/or when utilization information is processed by the utilization information processor 68, illustratively by entering or modifying utilization thresholds, could also be controlled through the user interface 66.

Figure 4:
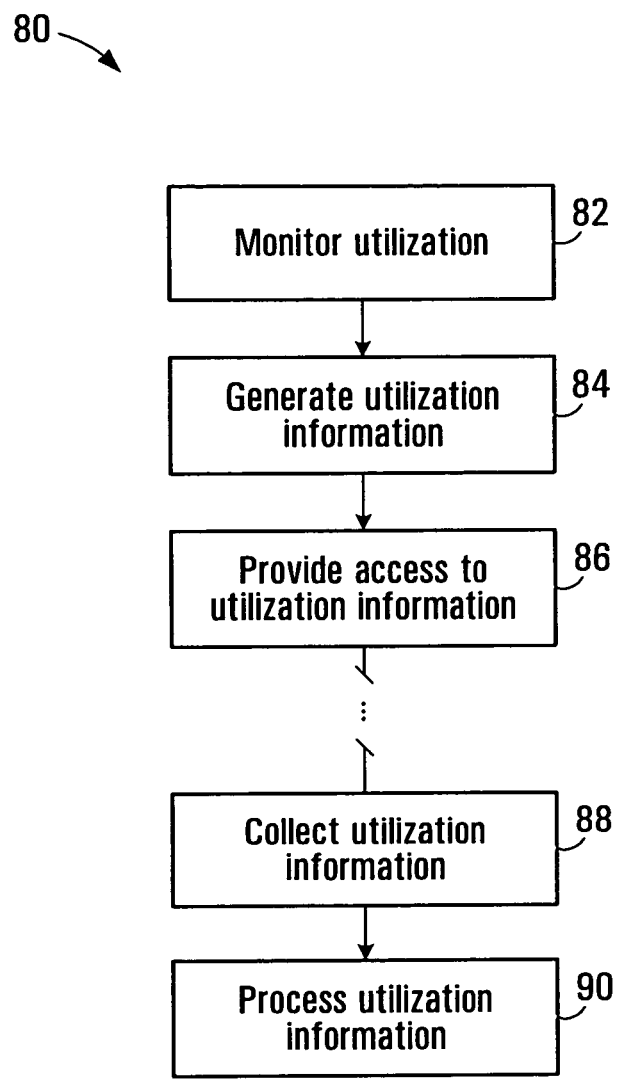
FIG. 4 is a flow diagram illustrating a method of an embodiment of the invention.

Aspects of the invention may also or instead be embodied in methods. FIG. 4 is a flow diagram illustrating an example of such a method.

With reference to FIG. 4, the method 80 involves monitoring utilization of bandwidth on a wireless communication link at 82, generating bandwidth utilization information based on the monitoring at 84, and providing access to the bandwidth utilization information at 86. These operations may be performed at one or more wireless link nodes, for example. The operations of collecting utilization information at 88 and processing the utilization information at 90 could be implemented at one or more management systems or servers in a communication system, and/or even at one or more wireless link nodes.

The method 80 is illustrative of one embodiment of the invention. Other embodiments may involve further, fewer, and/or different operations, performed in a similar or different order. Additional variations may also be or become apparent to those skilled in the art. For example, various options for performing at least some of the operations shown in FIG. 4, as well as other variations, will be apparent from the foregoing description of FIGS. 2 and 3.

A further, more detailed, illustrative embodiment of the invention is described below. It should be appreciated that this example represents one possible embodiment of the invention. Other embodiments need not necessarily include the following features.

Bandwidth utilization logging in accordance with an embodiment of the invention creates bandwidth utilization records that indicate the bandwidth utilization over a reporting period. The running average bandwidth utilization and/or the maximum bandwidth utilization in a given period may both be recorded. At the end of a reporting period a record is written to memory, illustratively a flash memory. In one embodiment, up to 60 records can be stored in flash.

In the detailed illustrative embodiment below, the following terminology is used, but should not be taken as limiting other embodiments of the invention as disclosed herein:

Running Average—A running average is the unweighted mean of the previous n data points.

Running Average Bandwidth Utilization—Since bandwidth utilization might not be computed on an exact time boundary, it might not be possible to compute the running average by simply adding together n samples of bandwidth utilization. Instead, the Running Average Bandwidth Utilization could be calculated as the Sum of all egress byte samples divided by the sum of all sample durations such that the sum of the sample durations is close to the running average period.

Running Average Period—The duration of the denominator (the sum of the sample durations).

Bandwidth Sample—This is a sampling of the locally egressed bytes and the time it took for those bytes to egress.

Bandwidth Macro Sample—The Running Average Period is divided into 3600 macro samples in one embodiment. The running average is an array of 3600 bandwidth samples, so the accuracy of the running average period is +/−1/3600*Running Average Period.

Bandwidth Utilization Report—This is a bandwidth utilization report that is saved in flash. There are up to 60 reports that can be saved. The oldest record is overwritten by the newest record when the 60th report is generated. Each report indicates the maximum bandwidth utilization and the time that the maximum was determined and a set of counters for up to 10 bandwidth utilization thresholds.

Reporting Period—The reporting period is the number seconds between reports being generated.

Logs

This feature may be used to log bandwidth utilization records using flashlog and syslog subsystems, for example. An abbreviated form of each record could be provided in flashlog, with an entire record being reported in syslog. Example reports are shown below.

FlashLog Report:
0 04/11/2009 15:38:07 0 DW999ZZZ9999 139 I bwl: ser:1, max:88%,
[85045,84986,84925,84893,84720,84719,84699,84103, 2114,1713]

Syslog Report:
04-11-2009 16:38:19 Local4.Info 192.168.11.99 Apr 11 15:38:07 DW999ZZZ9999 bwl: sn:1,date:"02/05/2009 15:52:38
",elapsed:86400,max:[date:"01/05/2009 17:45:15
",egressspeed:397,peercurspeed:450,util:88%],peercurspeed:450,mac:000758
00C01A,usn:DW109ABC1016,peerusn:DW110ABH1013, samplesize:1012 ms,bins:[10%
:85045,20%:84986,30%:84925,40%:84893,50%:84720, 60%:84719,70%:84699,80%:8
4103,90%:2114,95%:1713],md5:
1869f1a4ba429a8fa042771d52758d75

The format of the syslog report is very similar to the format produced by the "get bandwidth record verbose" command described below except that the command prepends the instance number of the record for convenience.

Configuration is saved in the system configuration area in local flash at a wireless link node. Once the configuration is changed, the save mib command will save the configuration to the system configuration area and will be available the next time the wireless link node restarts.

Summary of CLI Commands
Configuration Commands

The following are examples of configuration commands that might be provided, for example, in a CLI:
  get bandwidth record admin
  get bandwidth record average period
  get bandwidth record reporting period
  get bandwidth record thresholds
  set bandwidth record thresholds 10 20 30 40 50 60 70 80 90 95
  get bandwidth record logging
  set bandwidth record logging <on|off>.

Status Commands

Examples of status commands include the following:
  get bandwidth record instance [0 . . . 59]
  get bandwidth record current
  get bandwidth record brief
  get bandwidth record verbose.

These examples are discussed in detail below.

The "get bandwidth record admin" command will return the administrative status of bandwidth logging:
  >get bandwidth record admin
  Bandwidth logging admin status set to 'on'
  Bandwidth logging oper status is 'on'
  Reason:

If the feature is "on" then the bandwidth utilization feature is turned on using the configured parameters. Also shown is the bandwidth logging operational status. The "reason" field is updated with to indicate a reason if the operational status is other than "on".

The "get bandwidth record average period" command will return the running average period, in seconds, over which the running average is computed:
  >get bandwidth record average period
  Bandwidth logging running average period set to 30 seconds The running average bandwidth utilization is the data rate over the past period divided by the maximum data rate. The data rate over the past period is the number of mega bits that have egressed locally, divided by the elapsed seconds, which is about the same as the period duration.

The "get bandwidth record reporting period" command gets the reporting period (in seconds):
  >get bandwidth record reporting period
  Bandwidth logging reporting period set to 86400 seconds After the reporting period has elapsed, a report will be saved in flash indicating the maximum bandwidth utilization found during the reporting period. A log will also be generated if "bandwidth record logging" is turned on.

The "get bandwidth record thresholds" command will get the bandwidth utilization threshold integers that are used to keep track of the distribution of bandwidth utilization samples:
  >get bandwidth record thresholds
  Bandwidth Utilization Thresholds:
  10 20 30 40 50 60 70 80 90 95

There are ten integers in the example shown. The sampling rate decreases as the running average period increases since there is a fixed amount of memory keeping track of the running average in some embodiments.

The set bandwidth record thresholds command will set the bandwidth utilization threshold integers, which again include ten integers in this example:
  >set bandwidth record thresholds 10 20 30 40 50 60 70 80 90 99
  Bandwidth Utilization Thresholds set to: 10 20 30 40 50 60 70 80 90 99
  Info: bwl: thresholds set to 10 20 30 40 50 60 70 80 90 99
  Info: bwl: restarted with average period 3600s reporting period 86400s The "get bandwidth record logging" command will get the logging status. This indicates whether syslog and flashlog messages are generated. Reports may be saved in flash regardless of whether the message feature is on or off:
  >get bandwidth record logging
  Bandwidth logging to syslog and flashlog set to 'on'

The "set bandwidth record logging" command will turn the logging on or off:
  >set bandwidth record logging off
  Bandwidth utilization logging to both event log and syslog set to 'off'
  >set bandwidth record logging on
  Bandwidth utilization logging to both event log and syslog set to 'on'
  Info: bwl: Bandwidth Logging syslog and flashlog status set to 'off'
  (execute saveMIB to save in flash)
  Info: bwl: Bandwidth Logging syslog and flashlog status set to 'on'
  (execute saveMIB to save in flash)

The "get bandwidth record instance" command will retrieve the specified instance of a record from flash:

```
>get bandwidth record instance 0
Serial Number:              : 1
Report ending               : 02/05/2009 15:52:38
Maximum utilization
   Utilization was          : 88%
   Time and date was        : 01/05/2009 17:45:15
   Egress Speed was         : 397 Mbps
   Peer Current Speed was   : 450 Mbps
   Egress bytes were        : 178713641492
   Elapsed cycles were      : 90021622135
Reporting period duration was : 86400s
Unit serial number was      : DW109ABC1016
Peer unit serial number was : DW110ABH1013
Peer Current Speed was      : 450 Mbps
MAC Address was             : 00075800C01A
Instantaneous Utilization Counts were (average sample duration 1012ms):
   10%:  85045 (86088 seconds)
   20%:  84986 (86028 seconds)
   30%:  84925 (85966 seconds)
   40%:  84893 (85934 seconds)
   50%:  84720 (85759 seconds)
   60%:  84719 (85758 seconds)
   70%:  84699 (85737 seconds)
   80%:  84103 (85134 seconds)
   90%:   2114 (2139 seconds)
   95%:   1713 (1734 seconds)
```

The "get bandwidth record brief" command (below) results in a brief view of all of the records stored in flash. There are up to 60 record positions available in one embodiment. When all positions are full, then the oldest record is overwritten with the newest record.

The "get bandwidth record current" command will retrieve the current record which has not yet been written to flash. The running average bandwidth utilization will not be valid until the running average period has elapsed:
>get bandwidth record current
Current Running-Average Bandwidth Utilization: 90% (valid in 1319s)
Maximum Running-Average Bandwidth Utilization (averaging period=
3600s):
   Date and Time: not available (ready in 1319s)
   Utilization: 0%
Elapsed time in reporting period (period=86400s): 2281s
Instantaneous Utilization Counts were (average sample duration 1046 ms):
   10%: 2048 (2143 seconds)
   20%: 2048 (2143 seconds)
   30%: 2044 (2138 seconds)
   40%: 2037 (2131 seconds)
   50%: 2036 (2130 seconds)
   60%: 1951 (2041 seconds)
   70%: 1950 (2040 seconds)
   80%: 1947 (2037 seconds)
   90%: 1944 (2034 seconds)
   95%: 1935 (2024 seconds)

Note the message "(valid in 1319s)", which indicates that the running average will not be valid until a full hour has elapsed. Once the running average period has elapsed, then this command will show the maximum running average bandwidth utilization detected so far for the current reporting period.

The instantaneous utilization counts indicate how many instantaneous samples exceeded (or equalled) the specified utilization threshold. An approximation of the number of seconds that the bandwidth utilization exceeded (or equalled) these thresholds can be computed by multiplying the number of samples by the average sample duration). For example, for the 95% threshold, 1935 samples*1046 ms/sample is 2024 seconds. Thus, the monitored wireless link has been running at 95% bandwidth utilization for 2024 seconds out of the 2281 seconds during which the current reporting period has been active.

The "get bandwidth record brief" command will give a brief view of the stored records:

| >get bandwidth record brief | | | | | |
|---|---|---|---|---|---|
| Inst | Serial | Date of Report | Date of Max | Utilization | Util |
| 0 | 1 | Feb, 05, 2009 15:52:38 | Jan. 05, 2009 | 17:45:15 | 88% |
| 1 | 2 | Mar. 05, 2009 15:52:39 | Mar. 05, 2009 | 10:25:09 | 84% |
| 2 | 3 | Jul. 05, 2009 15:46:56 | Jul. 05, 2009 | 12:14:36 | 43% |
| 3 | 4 | Sep. 05, 2009 17:15:10 | Aug. 05, 2009 | 18:16:35 | 33% |
| 4 | 5 | Oct. 05,2009 17:15:13 | Sep. 05, 2009 | 17:46:52 | 32% |

This command can also be used to find the association between a record's serial number and the instance in flash. The first date is the date that the report was generated. The second date, the date of Max Utilization, is the local-time within the past reporting period (1 day) that the maximum running-average bandwidth utilization was detected.

The "get bandwidth record verbose" command will give a verbose view of the stored bandwidth records including an MD5 hash of the information appended to the end of the line to ensure integrity:
>get bandwidth record verbose
instance:0,sn:1,date:"02/05/2009 15:52:38
",elapsed:86400,max:[date:"01/05/2009
17:45:15 ",egressspeed:397,peercurspeed:450,util:88%],
peercurspeed:450,mac:00075800C01A,usn:
DW109ABC1016,peerusn:DW110ABH1013,
samplesi
ze:1012 ms,bins:[10%:85045,20%:84986,30%:84925,40%:
84893,50%:84720,60%:84
719,70%:
84699,80%:84103,90%:2114,95%:1713],md5:
1869f1a4ba429a8fa042771d52758d75
. . .
instance:4,sn:5,date:"10/05/2009 17:15:13
",elapsed:86400,max:[date:"09/05/2009
17:46:52 ",egressspeed:328,peercurspeed:1000,util:32%],
peercurspeed:1000,mac:00075800C01A,usn:
DW109ABC1016,peerusn:DW110ABH1013
,samples
ize:1012        ms,bins:[10%:85371,20%:85371,30%:85371,
40%:0,50%:0,60%:0,70%:0,8
0%:0,90%
:0,95%:0],md5:827fd53971362fbe3104df9ca124c3c5

The example record shown above includes strings having name-value pairs separated with a colon (i.e., name:value). Square brackets indicate a structure or an array of contained name-value pairs. Brief descriptions of the names appearing the example are provided below:
   instance—This is the instance number in the array of records stored in flash.
      sn—This is the serial number of the record. In some embodiments, this number always increases and can be used to find non-contiguous recording segments (i.e., if the serial numbers are non-contiguous).
      date—This is the local date and time that the record was created and stored in flash.

elapsed—This is the number of seconds that elapsed during the reporting period, in seconds.

max—This is a structure containing maximum bandwidth utilization.

date—This is the local date and time that the maximum occurred.

egressspeed—This is the maximum running average speed detected, in Mbps, as determined at the time of the maximum.

peercurspeed—This is the current speed of the peer device at the far end of the wireless communication link being monitored, in Mbps, as determined at the time of the maximum.

util—This is the running average bandwidth utilization at the time of the maximum. Note that this is the local bandwidth utilization where the egress rate is determined by measuring the bit rate egressing locally.

peercurspeed (second occurrence)—This is the current speed of the peer device, in Mbps, at the time the report was generated.

mac—This is the Ethernet address of the device at the time that the report was generated.

usn—This is the unit serial number of the device at the time that the report was generated.

peerusn—This is the peer device serial number at the time that the report was generated.

samplesize—This is the average duration of a bandwidth utilization sample.

bins—This is an array of bandwidth utilization counters where the name is a configurable percentage and the value is the number of samples that had a bandwidth utilization greater than or equal to the configured threshold of the bin. Note that the bandwidth utilization samples in these bins are not the running-average. Bursts of high utilization will begin to affect the average bandwidth utilization when the duration of the burst approaches the average period (e.g. 1 hour).

md5—This is an MD5 sum of the record as described above.

The foregoing detailed example illustrates various ways in which features described herein might be performed in some embodiments.

In accordance with embodiments of the invention, a bandwidth recording mechanism facilitates, among other things, billing a customer for actual bandwidth usage on wireless communication links without dropping bursty traffic. Average bandwidth usage of the links can be calculated continuously over an averaging time period, which may be configurable. Peak usage is also recorded on daily basis in some embodiments.

One or more, possibly configurable, bandwidth utilization thresholds can be provided, and durations of bandwidth utilization exceeds these thresholds should be recorded. This type of processing or analysis of bandwidth utilization information can provide a record of the distribution of traffic peaks, as opposed to just daily peak information, for example. Traffic peak distribution might give a more accurate picture of actual bandwidth usage on a wireless communication link, which could be important for such purposes as network analysis and/or customer billing for instance.

Records of bandwidth utilization may contain date and/or time information. Verification information, such as a hash key based a standard hashing algorithm, for example, may also be computed for use in authenticating records and protecting records against tampering.

As noted above, wireless link nodes at each end of a wireless communication link may calculate local bandwidth utilization for opposite directions of communications on that link. Such calculations at each node may take into account the bandwidth setting at the far end of the wireless communication link, and accordingly fast communication side channels may be provided to exchange bandwidth settings between the two ends of the wireless link. Other information, such as the calculated bandwidth utilization information and/or egress speed information for example, might also or instead be transferred between wireless link nodes using the same or different side channels.

The proposed bandwidth logging mechanisms can thus be used to allow consumers to use wireless communication links for bursty traffic conditions, while being billed for their actual usage, illustratively their average bandwidth usage, of each link. From a consumer perspective, this mechanism eliminates the necessity to continuously monitor the wireless links for traffic conditions and hence upgrade link speed as needed.

What has been described is merely illustrative of the application of principles of embodiments of the invention. Other arrangements and methods can be implemented by those skilled in the art without departing from the scope of the present invention.

For example, the divisions of functions shown in FIGS. 2 and 3 are illustrative of embodiments of the invention. Further, fewer, or different elements may be used to implement the techniques disclosed herein.

In addition, although described primarily in the context of methods and systems, other implementations of the invention are also contemplated, as instructions stored on a computer-readable medium, for example.

We claim:

1. A communication system comprising: a wireless link node device comprising: a wireless interface that enables communications over a wireless communication link; a utilization monitor, operatively coupled to the wireless interface, that monitors utilization of bandwidth on the wireless communication link and generates bandwidth utilization information associated with the wireless communication link, and a monitor interface, operatively coupled to the utilization monitor, that provides access to the bandwidth utilization information, at least one of the wireless interface, the utilization monitor, and the monitor interface being implemented using hardware, firmware, components which execute software, or a combination thereof; and a management system, the management system comprising: a monitor interface that enables access to the bandwidth utilization information from the wireless link node; a utilization information collector, operatively coupled to the monitor interface, that collects the bandwidth utilization information for the wireless communication link from the wireless link node; and a utilization information processor that processes the collected bandwidth utilization information to determine usage charges to be assessed to a customer for usage of bandwidth on the wireless communication link.

2. The system of claim 1, wherein:
the utilization monitor generates the bandwidth utilization information by determining durations of bandwidth utilization above respective different thresholds; and
the utilization information processor determines the usage charges based on the durations of bandwidth utilization above the respective different thresholds.

3. The system of claim 2, wherein the monitor interface of the wireless link node further enables user configuration of one or more of the respective different thresholds.

4. The system of claim 1, wherein the wireless link node further comprises:

a memory operatively coupled to the utilization monitor, wherein the utilization monitor writes records of the bandwidth utilization information to the memory, each record comprising a unique identifier of the wireless communication link and a time stamp indicating a time at which the record was written to the memory.

5. The system of claim 4, wherein the utilization monitor further generates verification information for use in authenticating and protecting each record against tampering, and stores the verification information in the memory of the wireless link node.

6. The system of claim 1, wherein the utilization monitor transmits the bandwidth utilization information to the management system through the monitor interface of the wireless link node.

7. The system of claim 4, wherein the monitor interface of the wireless link node is further operatively coupled to the memory of the wireless link node and further enables the records to be retrieved from the memory of the wireless link node.

8. The system of claim 1, wherein the wireless link node comprises one of a plurality of wireless link nodes of the communication system, each wireless link node of the plurality of wireless link nodes comprising:
    a wireless interface that enables communications over a respective wireless communication link;
    a utilization monitor that monitors utilization of bandwidth on the respective wireless communication link and generates respective bandwidth utilization information associated with the respective wireless communication link; and
    a monitor interface that provides access to the respective bandwidth utilization information,
    wherein:
        the monitor interface of the management system enables access to the respective bandwidth utilization information from the plurality of wireless link nodes;
        the utilization information collector of the management system collects the respective bandwidth utilization information for one or more of the wireless communication links from the wireless link nodes associated with the one or more wireless communication links; and
        the utilization information processor of the management system processes the collected respective bandwidth utilization information to determine usage charges to be assessed to one or more customers for usage of bandwidth on the one or more wireless communication links.

9. An apparatus comprising:
    a monitor interface that enables access to respective bandwidth utilization information generated at wireless link nodes on the basis of monitoring utilization of bandwidth on respective wireless communication links associated with the wireless link nodes;
    a utilization information collector, operatively coupled to the monitor interface, that collects the respective bandwidth utilization information for one or more of the wireless communication links from the wireless link nodes associated with the one or more wireless communication links; and
    a utilization information processor that processes the collected respective bandwidth utilization information to determine usage charges to be assessed to one or more customers for usage of bandwidth on the one or more wireless communication links,
    at least one of the monitor interface, the utilization information collector, and the utilization information processor being implemented using hardware, firmware, components which execute software, or a combination thereof.

10. The apparatus of claim 9, wherein, for each customer, the utilization information processor:
    processes the collected respective bandwidth utilization information to identify records of bandwidth utilization information for wireless communication links associated with the customer; and
    determines an amount of bandwidth usage for which the customer is to be charged based on the identified records.

11. The apparatus of claim 10, wherein each record comprises a unique identifier of one of the respective wireless communication links and a time stamp indicating a time at which the record was written to a memory at the wireless link node associated with the respective wireless communication link.

12. The apparatus of claim 9, further comprising a memory, operatively coupled to the utilization information processor and the utilization information collector, wherein the utilization information collector stores the collected respective utilization information in the memory and the utilization information processor accesses the collected respective utilization information stored in the memory.

13. The apparatus of claim 9, wherein, for at least one of the one or more wireless communication links, the collected respective bandwidth utilization information comprises records of one or more of:
    peak bandwidth usage during a reporting period;
    peak average bandwidth usage over a running average period; and
    time durations of bandwidth utilization above different thresholds.

14. The apparatus of claim 9, wherein, for at least one of the one or more wireless communication links, the collected respective bandwidth utilization information comprises records of respective bandwidth utilization, each record having associated therewith verification information for use in authenticating and protecting each record against tampering, wherein the utilization information processor performs a verification check of each record using the verification information associated with the record.

15. The apparatus of claim 9, wherein:
    the collected respective bandwidth utilization information comprises records of durations of bandwidth utilization above respective different thresholds; and
    the utilization information processor determines the usage charges based on the durations of bandwidth utilization above the respective different thresholds.

* * * * *